United States Patent [19]

Tawse

[11] 4,347,702
[45] Sep. 7, 1982

[54] POWER SYSTEM

[75] Inventor: Ian S. Tawse, Weston, Canada

[73] Assignee: Co-Gen, Inc., Miami, Fla.

[21] Appl. No.: 25,354

[22] Filed: Mar. 30, 1979

Related U.S. Application Data

[63] Continuation-in-part of Ser. No. 889,250, Mar. 23, 1978, abandoned.

[51] Int. Cl.³ ............................................. F01K 23/10
[52] U.S. Cl. ...................................... 60/618; 60/671; 60/676
[58] Field of Search ................. 60/618, 651, 671, 676; 62/238 E, 323 R

[56] References Cited

U.S. PATENT DOCUMENTS

| | | | |
|---|---|---|---|
| 1,979,128 | 10/1934 | Watson | 60/671 |
| 2,952,138 | 9/1960 | Russell et al. | 60/671 |
| 3,950,949 | 4/1976 | Martin et al. | 60/641 |
| 4,087,974 | 5/1978 | Vaughan | 60/618 |

Primary Examiner—Allen M. Ostrager
Attorney, Agent, or Firm—Alan H. Levine

[57] ABSTRACT

A vapor cycle power system in which the low level heat source is furnished by water or air via the medium of a compression cycle heat pump, and subsequent higher temperature level heat energies are provided by direct combustion, solar energy, geothermal energy or waste heat, singularly or in combinations thereof, in either or both gaseous or liquid forms. In certain embodiments of the invention, the system has the capability to provide heating and cooling in addition to the function of producing useful shaft work.

12 Claims, 8 Drawing Figures

POWER SYSTEM

This application is a continuation-in-part of Ser. No. 889,250, filed Mar. 23, 1978, now abandoned.

BACKGROUND OF THE INVENTION

This invention is directed toward the conservation of energy and the reduction of thermal pollution in both water borne and air borne forms.

The invention contemplates the production of useful shaft work at low energy input costs with said shaft work including the capability of driving generators and propelling marine craft. Another object of the invention is to provide under certain conditions, and as a by-product of the power system, chilled liquids for the purposes of providing air conditioning or process chilling, both normally considered high energy consumers with the additional disadvantage of electrical system overdesign in order to compensate for the inherently high starting torque of refrigeration compressors.

A further object of the invention, in certain embodiments thereof, and under certain conditions of operation is the production of low cost heat for either comfort or process requirements.

The thermodynamic principle of producing work in the Rankine cycle concept has long been understood, and although the utilization of the lower temperature boiling point fluids such as refrigerants has only more recently become practical, the basics as laid forth in this disclosure are such as to be readily understandable to those knowledgeable in Rankine cycle power systems, as would be the benefits and advantages of the system as outlined herein.

DESCRIPTION OF THE INVENTION

Three modes of function are illustratively outlined within this specification and will be hereinafter referred to respectively as Methods "A", "B" and "C". Methods "A" and "B" have been conceptually structured toward the production of shaft work and cooling effect only, while Method "C" is of an embodiment which, in addition to the production of shaft work and cooling effect, moreover allows for the production of useful heat in such form as to be useable for comfort or process heating.

In Methods "A" and "B", a low boiling point fluid such as a refrigerant is contained in an evacuated closed circuit, hereafter referred to as the "primary circuit", comprising a liquid reservoir, a liquid propelling means, a non-return valve, a multi-stage, series-connected heat exchanger or boiler, and an expansion engine or turbine connected by piping from its inlet to the vapor outlet of the heat exchanger, and its outlet connected by piping to the inlet of a water cooled condenser which in turn has its outlet connected by piping to the inlet of the liquid reservoir.

When the liquid propelling pump is activated, liquid refrigerant is pumped to the heat exchanger where it is evaporated by the application of transferred heat and the superheated vapor is then directed to the expansion engine for the performance of useful shaft work. The vapor then leaves the discharge side of the expansion engine at greatly reduced pressure and temperature and is converted back to a liquid state in the condenser for the recommencement of the cycle.

In Method "C" the primary circuit is modified as follows—

(a) A means for preheating the propellant used in the primary circuit while still in the liquid phase has been imposed between the outlet of the primary circuit's liquid reservoir and the inlet to the evaporator of said primary circuit.

(b) A second heat exchanger has been series interposed in the heat input side of the primary circuit's high temperature heat exchange section with both heat exchangers forming part of a closeable loop and thereby allowing for better utilization of hightemperature heat channelled to the system's primary circuit.

(c) By-pass systems have been interposed in all means of heat supply to the primary circuit in order that all or a portion of all heats supplied to said primary circuit may be channelled or diverted for the purpose of supplying utility heating.

Additional apparatus necessitated by the modifications to the primary circuit as described in the foregoing consists of the following—

For Modification (a)—A secondary liquid pump connected by piping on its suction side to the outlet of the liquid reservoir, a liquid feed regulator, connected on its upstream side by piping to the outlet of the secondary liquid pump, a non-return valve connected to the liquid feed regulator on its upstream side, and connected on its downstream side to a section of pipe leading to a liquid preheater which in turn has its outlet connected by piping to the suction side of the primary circuit's main liquid feed pump.

For Modification (b)—A second heat exchanger with means for accepting high temperature heat on the inside of its tubes and passing a liquid coolant about the outside of said tubes is incorporated in a closeable loop with such loop including, in addition to the added heat exchanger, a liquid propelling pump connected by pipe on its upstream side to the added heat exchanger, and on its downstream side connected by piping to the high temperature heat exchange section of the primary circuit's evaporator which in turn is connected on its outlet side by piping to a branch connection allowing entry to the inlet side of the low temperature heat exchanger section of the primary circuit's evaporator. Leaving the outlet side of the low temperature heat exchanger by way of another branch connection, the coolant is returned by piping to the inlet side of the added heat exchanger. In addition to the second heat exchanger, pump and piping referred to in the immediate foregoing, a sufficiency of valves has been added to insure such controlled coolant flow as may be required by system operating conditions.

For Modification (c)—Sufficient piping and valves have been added to allow for controlled by-passing of hot fluids in order to provide utility heat from the following heat level circuits:

1. Heat Pump Circuit
2. Internal Combustion Engine Water Jacket Heat Circuit
3. Internal Combustion Engine Exhaust Heat Circuit
4. High Temperature Heat Circuit Heat to achieve evaporation and superheating of the propellant fluid contained in the closed primary circuit, as described in the foregoing, is furnished by either or a combination of the following:

For METHOD "A"—A fairly conventional heat pump of the compression cycle type, using water as a heat source is used to furnish heat to the low temperature section of the closed cycle heat exchanger, and higher temperature levels of heat are provided by the water jacket and exhaust losses normal to an internal combustion engine of the type used to drive the compressor, the latter constituting the key component of the heat pump system.

Heat extracted from the heat pump source (water) is channelled directly to the primary circuit's low temperature heat exchanger section which in effect acts as the heat pump condenser.

For METHOD "B"—As in Method "A", low temperature heat is furnished by a water source heat pump, but in this instance, the heat pump compressor is driven by an electric motor powered from an electrical energy source. Higher temperature heat to the closed cycle heat exchanger is furnished by direct combustion, solar energy, geothermal energy or waste heat, singularly, or in combinations thereof in either or both gaseous or liquid forms.

For METHOD "C"—As in Method "A", low temperature heat is delivered to the primary circuit by a heat pump using water as a heat source with said heat pump being powered by an internal combustion engine, the water jacket and exhaust losses normal to which having been entrained to furnish higher temperature heat to the primary circuit. Yet higher level heat energies may be provided by solar energy, waste heat, geothermal heat, or direct combustion, singularly, or in combinations thereof in either or both gaseous or liquid forms.

Additional variants of the system of Methods "A", "B", and "C" are as follows:

(1) The water heat source for the heat pump is replaced by a warm gas heat source. Such source may be air or any process gas, for instance a waste combustion product. In order to effect this mode of energy supply, the heat pump's "water over" type evaporator together with its attendant water flow devices, is replaced by an "air through" finned evaporator as shown in FIGS. 5 and 6. Said evaporator is contained in a duct section through which the heat source gas is propelled by a fan. Cooled heat source gas on the downstream side of the evaporator would be available for refrigeration or air conditioning purposes.

(2) The water cooled start up condenser for the system's heat pump is replaced by an air cooled type. In this last manner of start up condensing the "water through" condenser as reflected in FIGS. 1 and 3 together with its associated water flow devices is replaced by a finned "air through" type as shown in FIGS. 6 and 7.

The air cooled condenser is contained in a section of duct which serves to channel cooling air, propelled by a fan across the outer surface of the condenser coil.

(3) The water cooled condenser for the system's primary circuit as shown in FIGS. 1, 3 and 4, together with its associated water flow devices, is replaced by an "air through" type air cooled condenser as shown in FIGS. 6 and 8. The finned type condenser coil is contained in a duct and a fan directs cooling air across the outer surfaces of the coil. Warmer air leaving the downstream side of the condenser coil (when sufficiently warm) can be channelled to the heat pump's "air through" type evaporator for energy entrainment or otherwise discharged to the ambient.

The evaporator of the heat pump is multi-functional in role, since, in addition to its primary purpose of removing heat energy from a relatively low temperature fluid for supply to the closed circuit's heat exchanger (boiler), the lowered temperature heat source fluid leaving the evaporator may be utilized to ensure condensing of the primary circuit's fluid, and/or may be used for air conditioning or process chilling.

Refrigerants proposed for the primary circuit of the invention include Freon No. 11, Freon No. 12, Freon No. 113, Freon No. 114 and Ammonia (R717) but, again, the invention is not restricted to the fluids so enumerated. Refrigerants suitable for the heat pump circuit of the system include Freon No. 12, Freon No. 22, and Ammonia (R717) but, again, the invention is not restricted to the fluids so enumerated.

GENERAL DESCRIPTION OF THE DRAWINGS

Figure 3:
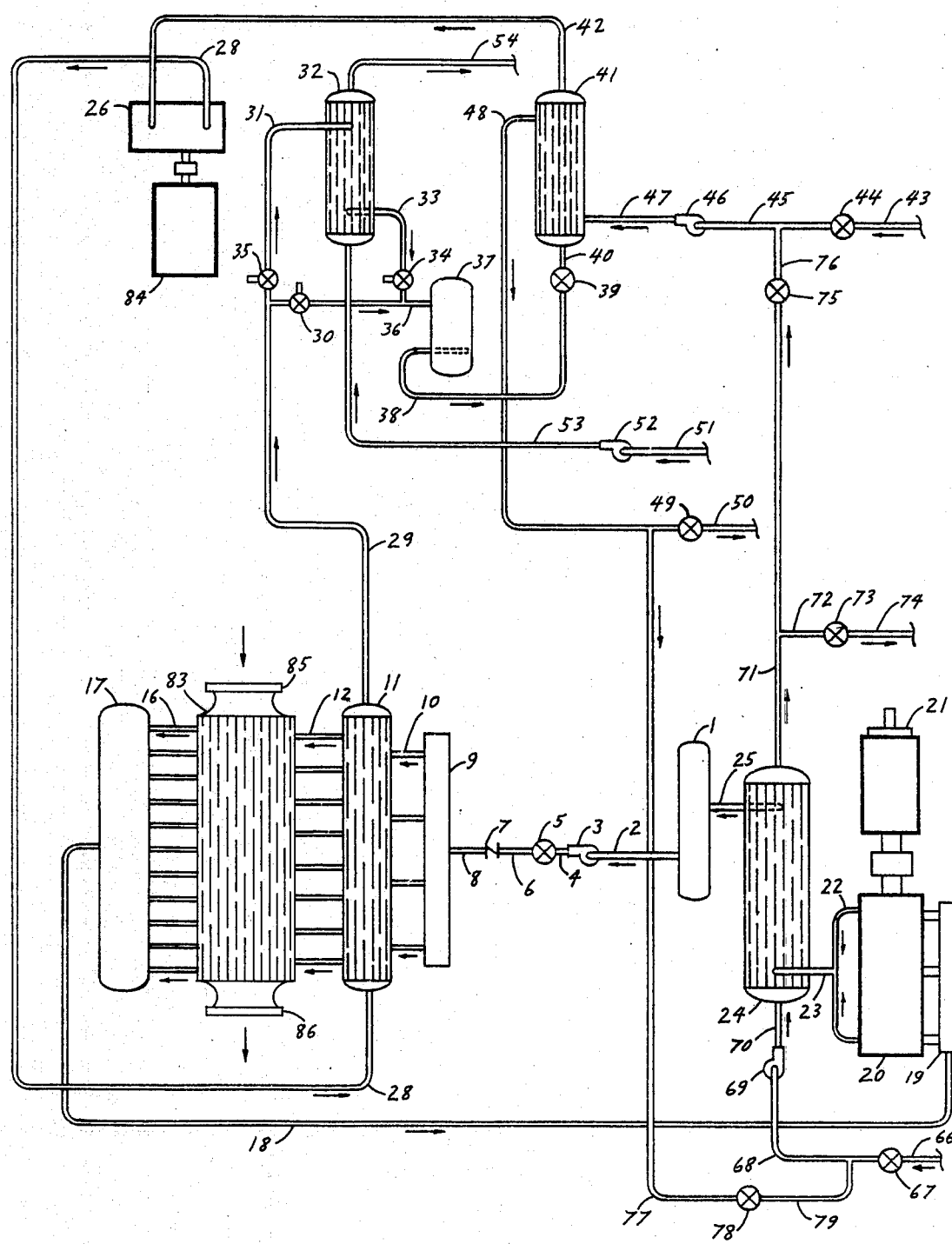

FIG. 3 is a schematic flow diagram of a further embodiment of the system in which a heat pump also supplies the low temperature heat to the primary circuit. In this arrangement, however, the heat pump compressor is operated by an electric motor, and the primary circuit heat exchanger (boiler) has been modified in order to receive higher temperature heat from such sources as direct combustion, solar energy, geothermal energy or waste heat, singularly or in combinations thereof, in either or both gaseous or liquid forms.

Figure 4:
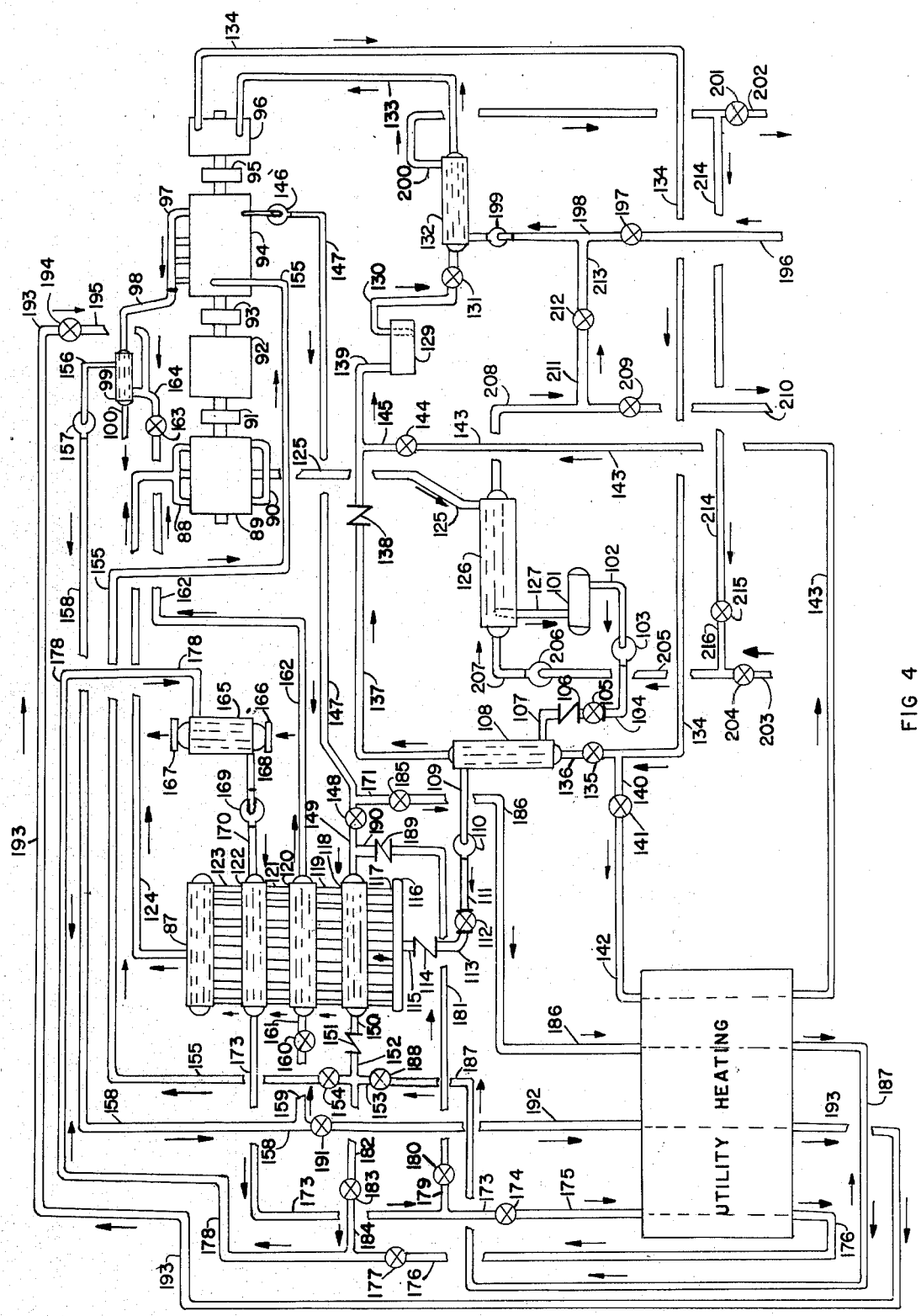

FIG. 4 is a schematic flow diagram of yet another embodiment of the invention wherein the low level heat energy input to the system's primary circuit is introduced during the liquid phase of the primary fluid's cycle via the medium of an imposed preheater, and an additional heat exchanger has moreover been interposed in the high temperature section of the system's primary circuit in order to further increase efficiency and provide greater utility of function. In this latter embodiment of the invention the major system components have been re-arranged for combination in such manner as to co-operate for the production of heat, electric power and cooling at extremely low energy input values and to provide maximized system "back up".

Figure 1:
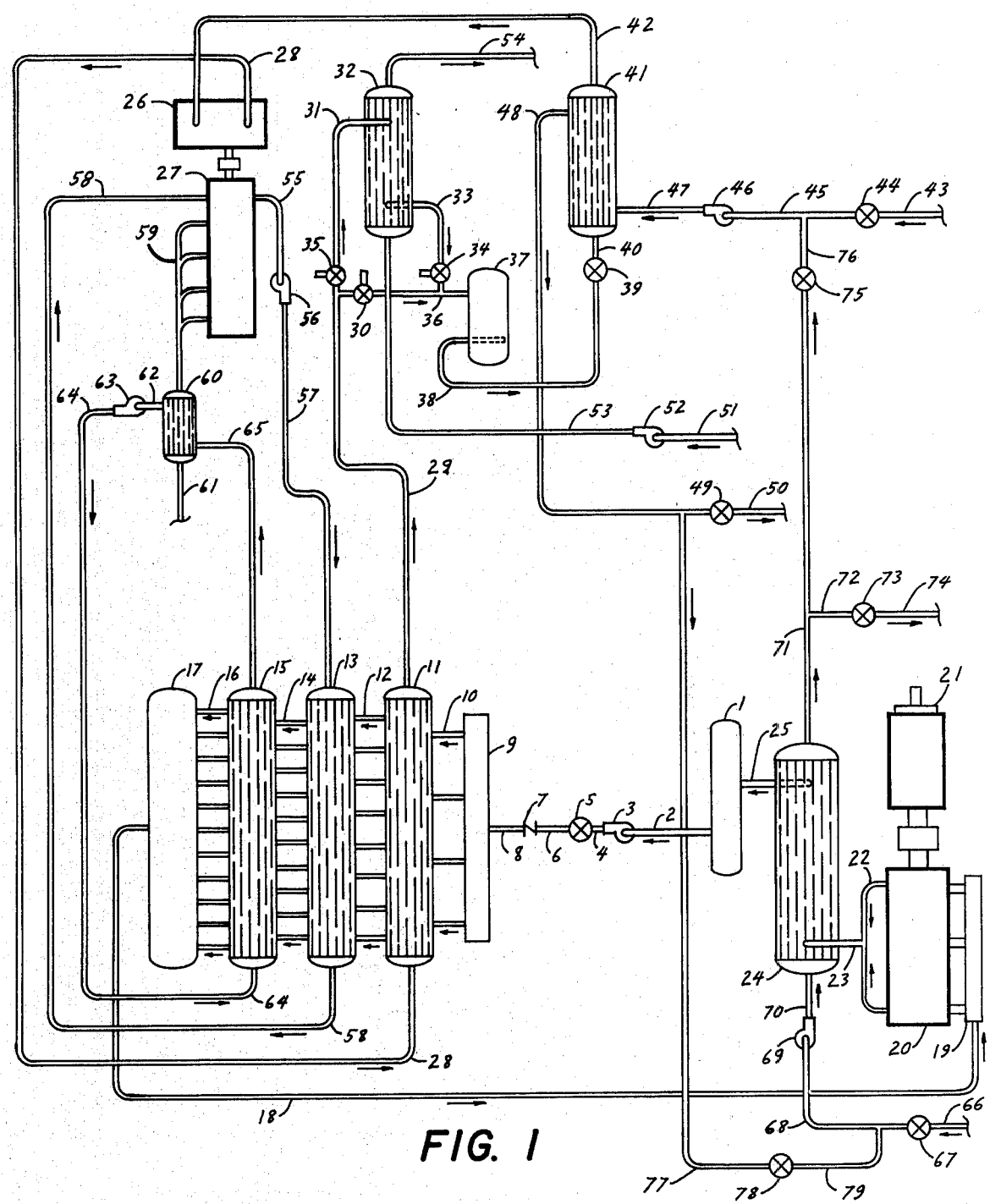
FIG. 1 is a schematic flow diagram of one embodiment of the invention wherein the heat pump supplying low level heat energy to the primary circuit is driven by an internal combustion engine, and higher level heat energies are furnished by the heat of water jacket and exhaust losses, which are normally wasted.
Figure 6:
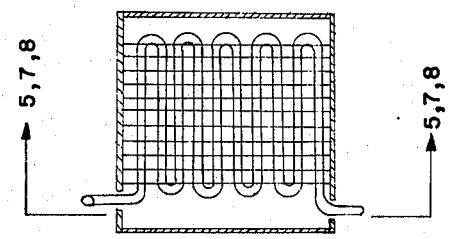
Figure 5:
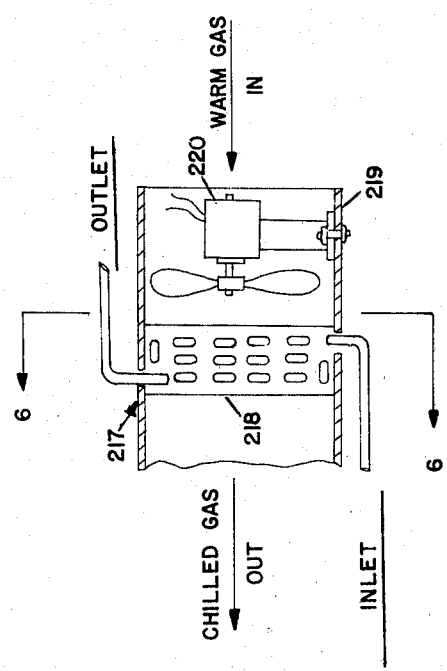

FIG. 5 is a side elevational view, partly in section, taken on line 5 of FIG. 6 and illustrating an alternative means of obtaining heat source energy in the heat pump circuit to that illustratively shown in FIGS. 1, 3 and 4.

Figure 7:
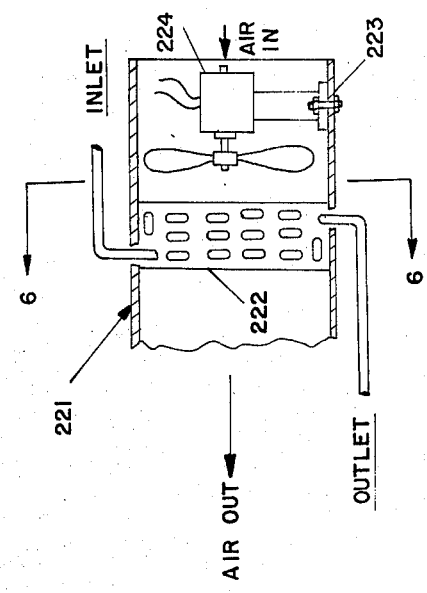
Figure 8:
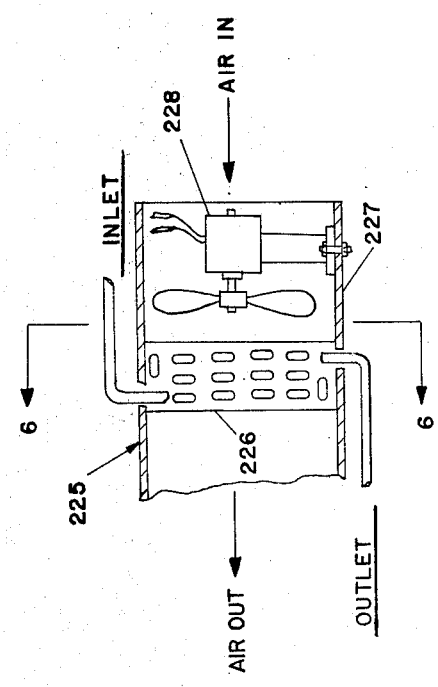

FIG. 6 is a cross sectional view as taken on line 6 of FIGS. 5, 7 and 8.

FIG. 7 is a side elevational view, partly in section, taken on line 7 of FIG. 6 and illustrating an alternative means of obtaining start up condensing for the heat pump circuit's refrigerant.

FIG. 8 is a side elevational view, partly in section, taken on line 8 of FIG. 6 and illustrating an alternative means of obtaining condensing of the motive fluid in the system's primary circuit.

DETAILED DESCRIPTION OF THE DRAWINGS AND EMBODIMENTS OF THE INVENTION

Figure 2:
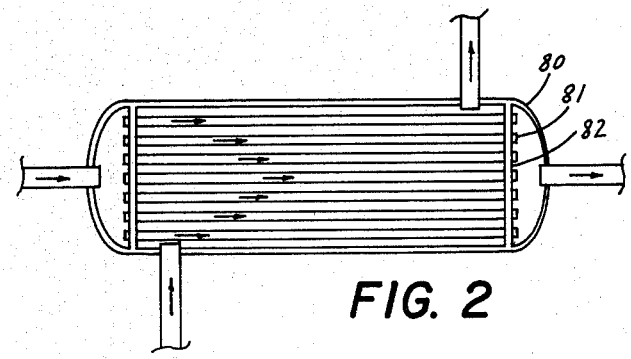
FIG. 2 shows a typical shell and tube type heat exchanger as indicated at all areas of direct heat exchange shown in FIGS. 1, 3 and 4. It is not, however the intent of this disclosure to restrict the means of heat exchange to the medium as shown in the drawings, and the shell and tube method of exchange has been used illustratively only in the interests of clarity.

In FIG. 1, a liquid reservoir 1 is indicated, a liquid refrigerant (or primary fluid) such as Freon No. 21, is drawn from the reservoir through pipe section 2 to the liquid propelling pump 3 from which the liquid is propelled at a pressure somewhat higher than the operating pressure of the primary circuit through section 4, through flow regulating valve 5 which functions to control the liquid demand of the system, through pipe section 6 and non-return valve 7, the purpose of which is to prevent return flow during periods of pump "cut-out". Beyond valve 7 the liquid passes through pipe section 8 to manifold 9, then through a plurality of pipes 10 to heat exchanger 11 where heat transferred from inner tubes 81, as indicated in FIG. 2, partially vaporizes the liquid.

From heat exchanger 11 the primary fluid passes through a plurality of pipes 12 to heat exchanger 13 where higher temperature transferred heat continues the evaporation process of the primary fluid. Leaving heat exchanger 13, the primary fluid passes through a plurality of pipes 14 to heat exchanger 15 where still higher temperature heat transfer further evaporates and superheats the primary fluid.

Leaving heat exchanger 15 the superheated vapor passes through a plurality of pipes 16 to vapor drum 17 from which it is propelled through pipe 18 to expansion engine inlet meanifold 19.

From manifold 19, the pressurized superheated vapor is directed to the pistons or turbine blades of the expansion engine 20 upon which work is performed with such work being conventionally converted to the rotation of a shaft in order to drive a load 21 such as a generator or power other types of rotating machinery. Having performed useful work at the expansion engine 20, the primary fluid at reduced pressure and temperature exits the expansion engine 20 through outlet manifold 22 and is directed through pipe section 23 to the condenser 24 where the conversion of the primary fluid vapor back into the liquid is achieved due to the cooling effect of cold water being moved through the inner tubes of the condenser 24. The liquid state primary fluid accumulating in the bottom of the condenser 24 is returned through pipe section 25 to the liquid reservoir 1 for recommencement of the cycle.

A modified heat pump of the compression cycle type is employed to furnish low level heat energy to the previously described primary circuit. The heat pump contains the essentials of a conventional cycle including a compressor, condenser, expansion valve and evaporator, all contained in a closed evacuated circuit which is charged with a refrigerant, such as Freon No. 12.

A more detailed description of the heat pump section of the power system follows:

A refrigeration compressor 26 is driven by an internal combustion engine 27. Hot discharge gas from the compressor outlet is propelled through a pipe 28 to heat exchanger 11 where the heat energy of the discharge gas (absorbed heat of the evaporator plus the connected load of the internal combustion engine) is given up to the primary circuit fluid. In effect, the heat exchanger 11 functions as the condenser for the heat pump circuit. Under condition of normal power system operation, the condensed heat pump refrigerant leaving the heat exchanger 11 is channeled to the liquid receiver 37 as follows: through pipe section 29, through solenoid valve 30, and pipe section 36. Under normal operating circumstances as above described, solenoid valves 34 and 35 are in the closed position and valve 30 is in the open position.

During system start up and due to the probable gaseous state of the primary fluid in the heat exchanger 11, an alternative method of achieving condensing of the heat pump refrigerant is employed. In this latter method, the compressor discharge is directed through pipe 28, heat exchanger section 11, pipe section 29, solenoid valve 35 and pipe section 31 to the water cooled condenser 32 in which condensing of the refrigerant occurs. The condensed refrigerant is then channelled to liquid receiver 37 through pipe section 33, solenoid valve 34 and pipe section 36. In this latter mode of achieving condensing of the refrigerant, the solenoid valve 30 is in the closed position and solenoid valves 34 and 35 are in the open position. Also in this alternate mode of condensing, condenser cooling water is drawn through pipe section 51, propelled by pump 52 through pipe section 53, the tubing of condenser 32 and ejected via pipe section 54.

The condensed refrigerant now deposited in liquid receiver 37 is propelled through pipe section 38 to expansion valve 39 at which point the liquid refrigerant is expanded through pipe section 40 and the inner tubes of evaporator 41. Absorption of low level heat energy from water flowing over the inner tubes of the evaporator 41 now occurs and the heat energy enriched refrigerant is returned to the compressor 26 via pipe section 42 for temperature "stage-up".

In order to provide heat source water for the heat pump cycle, water of suitable temperature is drawn through pipe section 43, modulating valve 44, pipe section 45 and propelled by pump 46 through pipe section 47 across the tubes contained in evaporator 41 and under normal conditions of operation is ejected at a lowered temperature through pipe section 48, modulating valve 49 and pipe section 50. In this sequence of operation, modulating valves 44 and 49 are in the open position and modulating valves 75 and 78 are in the closed position.

In further consideration of FIG. 1, the second level of heat energy to the primary circuit heat exchanger (boiler) is furnished as follows: a closed circuit, containing a liquid coolant, originates at the water jacket of the internal combustion engine 27; the liquid coolant, heated by the water jacket losses, is drawn through pipe section 55 by pump 56, the tubes of heat exchanger 13, where the heat of the coolant is transferred to the primary fluid, and returned to the engine water jacket via pipe section 58.

The third heat energy level of the system as set forth in FIG. 1 is provided in the following manner: the internal combustion engine exhaust losses or a major portion thereof are recovered by a heat exchanger 60 receiving exhaust gases from exhaust manifold 59 of the engine, the cooler exhaust gases leaving heat exchanger 60 through pipe 61. A liquid coolant is contained in a closed circuit originating at the heat exchanger 60. The coolant, heated by the exhaust losses recovered by the exchanger 60 is drawn through pipe section 62, propelled by pump 63 through pipe section 64, through the tubes of heat exchanger 15 (where the coolant's heat is transferred to the primary fluid) and returned to the heat exchanger 60 through pipe 65.

Cooling for the condenser 24 of the primary circuit is provided for as follows: cooling water is drawn through a pipe section 66, modulating valve 67, a pipe section 68, and is propelled by a pump 69 through a pipe section 70, the tubes of the condenser 24, and, under normal conditions of operation, discharged through pipe sections 71 and 72, modulating valves 73, and pipe section 74. In this mode of function, modulating valves 67 and 73 are in the open position, and modulating valves 75 and 78 are in the closed position.

In the operation of the system as embodied within the invention, should a need arise or a benefit derive from obtaining colder water than is normally or naturally available for the condensing of the primary fluid, colder water from the heat pump evaporator 41 discharge (heat source water) may be diverted to the primary circuit condenser 24 in the following manner: by the opening of a modulating valve 78 and the restriction of modulating valves 49 and 67, the chilled water leaving the heat pump evaporator 41 is caused to flow through a pipe section 77, modulating valve 78, pipe sections 79 and 68 for routing to the primary circuit condenser 24. Should it be found under yet another operating condition that heat source water to the heat pump evaporator 41 is running at a lowered temperature, this condition can be compensated for by the opening of modulating valve 75 and the restriction of modulating valves 44 and 73, thereby causing the warmer discharge water from the primary circuit condenser to flow through modulating valve 75 and pipe section 76 for diversion to the heat pump system evaporator 41.

FIG. 3 is a further embodiment of the invention in which the following changes have been effected: the internal combustion engine 27, driving the heat pump compressor 26, has been replaced by an electric motor 84, designated to obtain its power from electrical energy supplied by either the power system itself or from an external source. Heat energy circuits originating at the internal combustion engine's water jacket and exhaust system as shown in FIG. 1 have been eliminated as have primary circuit heat exchanger sections 13 and 15, together with the inter-connecting pipes 14.

In FIG. 3, the primary circuit heat exchangers so eliminated have been replaced by heat exchanger section 83, shown as having an inlet flange 85 and an outlet flange 86. This heat exchanger section 83 has the purpose of receiving high level heat energy from one or more of the following sources: direct combustion, solar energy, geothermal energy or waste heat singularly or in combinations thereof in either or both gaseous or liquid forms.

In all other respects the function of the power system remains as indicated in FIG. 1.

In both power system variants (FIG. 1 and FIG. 3) and under favorable conditions of operation, chilled water leaving the heat pump evaporator discharge pipe 50 may be utilized for the purposes of air conditioning or process chilling.

In FIG. 2, the typical components of a shell and tube type heat exchanger are indicated: the shell has been designated 80, tubes 81 and tube sheets 82.

In reference to FIG. 4 illustrative of Method "C" of function, a refrigerant in liquid state contained in liquid reservoir 101 is drawn by pump 103 through pipe 102, propelled by said pump 103 through pipe 104, liquid flow regulating valve 105, non-return valve 106, pipe 107 and across the outside of tubes contained in liquid preheater heat exchanger 108 wherein the refrigerant receives heat energy by exchange. From heat exchanger 108 the heated liquid is drawn by pump 110 through pipe 109 and is propelled by said pump 110 through pipe 111, liquid flow regulator 112, pipe 113, non-return valve 114, and pipe 115 to liquid distribution header 116. From liquid distribution header 116 the primary fluid passes through a plurality of pipes 117 and across the outer surface of tubes contained in heat exchanger 118 wherein transferred heat from said tubes proceeds to vaporize the primary fluid. Leaving heat exchanger 118 the primary fluid passes through a plurality of pipes 119, heat exchanger 120, a plurality of pipes 121, heat exchanger 122, a plurality of pipes 123 and so to vapor drum 87.

In passing through heat exchangers 120 and 122 the primary fluid is subject to further vaporizing and superheating by heat exchange with the warmer fluid flowing in the inner tubes of said heat exchangers 120 and 122.

Leaving vapor drum 87, the superheated primary fluid passes through pipe 124 to manifold 88 from where it is directed to the pistons or turbine blades of expansion engine 89 whereupon part of the kinetic energy of the primary fluid is given up to work with such work being conventionally converted to the rotation of a shaft in order to drive a load such as a generator 92, which is connected to the expansion engine 89 by an automatic clutch 91.

Having given up a portion of its kinetic energy to the expansion engine 89, the primary fluid at reduced pressure and temperature exits said expansion engine 89 via manifold 90 and is directed through pipe 125 to condenser 126 wherein the conversion of the primary fluid back to the liquid phase is achieved due to the cooling effect of cold water being moved through the inner tubes of said condenser 126. The primary fluid, having been returned to the liquid phase, accumulates in the bottom of condenser 126 and is returned through pipe 127 to liquid reservoir 101 for recommencement of the cycle.

Heat energy supply to the primary circuit of the system of Method "C" conformity as illustratively shown in FIG. 4 is obtained in the following manner:

(a) Low level heat energy for the preheating of the primary fluid is furnished by a modified heat pump of the compression cycle type, using water as a heat source for said heat pump.

A more detailed description of this method of heat energy obtainment will be gathered by the following when considered together with details reflected in FIG. 4.

Upon the activating of compressor 96 which is operated by an internal combustion engine 94 via the medium of automatic clutch 95, a liquid refrigerant such as Ammonia or Freon No. 12, contained in a liquid receiver 129 is propelled through pipe 130, through modulating expansion valve 131 and expanded in the inner tubes of evaporator type heat exchanger 132 at which time the refrigerant absorbs heat energy from water flowing across the outside of the tubes contained in said heat exchanger 132.

Leaving heat exchanger 132, the heat enriched refrigerant flows through pipe 133 and is returned to the suction side of compressor 96 which acts to stage up the temperature of the refrigerant being received. On leaving the discharge side of the compressor 96, and under normal conditions of system operation, the elevated temperature refrigerant is propelled through pipe 134, modulating valve 135, pipe 136 and through the inner tubes of liquid preheater heat exchanger 108 wherein the heat energy of the discharge gas from the compressor 96 (heat absorbed by the evaporator 132 plus the work performed by the internal combustion engine 94 in driving the compressor 96) is given up to the primary fluid liquid being moved across the outside of the tubes in heat exchanger 108. In consideration of heat exchange taking place in heat exchanger 108 it will be noted that the rejected heat from the heat pump system acts to preheat the liquid primary circuit fluid and the chilled liquid eminating from the primary circuit's condenser 126 acts as a condensing medium for the heat pump circuit.

Leaving heat exchanger 108, the heat pump circuit's refrigerant, now in liquid phase, is returned to liquid receiver 129 by way of pipe 137, non-return valve 138 and pipe 139 for recommencement of the refrigeration cycle.

It should be noted that modulating valves 141 and 144, located in pipes offering access to the refrigerant flow circuit immediately aforedescribed, are maintained in the fully closed position during the operation of the flow circuit last described.

During system start up, and due to the possible gaseous state of the primary fluid in heat exchanger 108, an alternative system of achieving condensing of the heat pump refrigerant has been provided. Such system would operate only until a steady flow of chilled primary fluid is available for the primary circuit's operation. During start up operations, discharge gas from the heat pump compressor 96 is diverted by the closing of modulating valve 135 located at the downstream end of pipe 134, and passed through pipe 140, modulating valve 141 which has been opened coincident with the closing of valve 135, through pipe 142, and enters a means of heat exchange (not shown) located in the utility heating area wherein the refrigerant gives up a sufficient quantity of its heat to achieve condensing. The refrigerant now in the liquid state is returned to the liquid receiver 129 by way of pipe 143, modulating valve 144, pipes 145 and 139.

It should be noted that the means of achieving "start up" condensing as last described is also a means whereby heat can be delivered to the utility heating area on a sustained basis in keeping with a normal heat pump function. This latter means of utilization of the heat pump would become a function of the invention at such time as the need for utility heating exceeded the requirement for heat supply to the system's primary circuit.

(b) A second means of supplying heat energy to the system's primary circuit is as follows: A closeable loop containing a coolant, and including in said loop the water jacket of an internal combustion engine, a heat exchange element forming part of the system's primary circuit, a liquid propelling means, and all interconnecting piping is made to transfer part of the heat losses of said internal combustion engine to the system's primary circuit evaporator. In greater detail, this sub-system functions in the following manner: A coolant contained in the aforediscussed loop and heated by the water jacket losses of the internal combustion engine 94 is propelled by pump 146 through pipe 147, modulating valve 148, pipe 149 and the inside of tubes contained in heat exchanger 118 wherein heat exchange transfers a portion of the heat contained in the coolant to the system's primary circuit fluid.

Leaving heat exchanger 118 at reduced temperature the coolant is propelled through pipe 150, non-return valve 151, pipe 152, pipe 153, modulating valve 154 and pipe 155 which then returns the coolant to the water jacket of the internal combustion engine 94. It should be noted that modulating valves 185, 188 and 183, located in pipe branches associated with the flow circuit last described, are maintained in the fully closed position during the basic function of the heat transfer process described in the foregoing.

(c) A further means of furnishing heat to the primary circuit's evaporator as illustratively shown in FIG. 4, and at a yet higher temperature level is as follows: Heat losses from the internal combustion engine's exhaust system, or a major portion thereof, are recovered by means of a heat exchanger 99, the inner tubes of which receive heat from the exhaust gasses of the internal combustion engine 94, collected by exhaust manifold 97 and pass to the heat exchanger 99 by exhaust pipe 98. The cooled exhaust gasses leave the heat exchanger 99 by way of tail pipe 100.

A liquid coolant, contained in a closable loop originating at heat exchanger 99, heated by the exhaust heat losses recovered by said heat exchanger 99, is drawn by pump 157 through pipe 156, propelled by said pump 157 through pipe 158, pipe 159, modulating valve 160, pipe 161 and the inner tubes of heat exchanger 120 wherein heat transfer is effected to the fluid flowing in the system's primary circuit. Having given up a portion of its heat to the primary circuit, the coolant is returned to heat exchanger 99 by way of pipe 162, modulating valve 163 and pipe 164. It will be noted that valves 191 and 194 located in pipe branches leading from the flow circuit last described are maintained in the fully closed position during the normal operation of the sub-system described in the immediate foregoing.

(d) Higher temperature heat energy (fourth temperature level) to the system's primary circuit is supplied and exploited in the following manner:

A heat exchanger 165, having its secondary side connected in a closeable loop and having an inlet flange 166 and an outlet flange 167 on its primary side, is made to receive a hot fluid through said flange 166, the hot fluid then passing in heat exchange through the inside of tubes contained in heat exchanger 165 and leaving said heat exchanger through outlet flange 167 at greatly reduced temperature due to its having given up a major portion of its heat to a liquid coolant contained in the closeable loop.

The hot fluid received by the primary side of heat exchanger 165 may be in either or both liquid or gaseous form, and the heat source for said fluid may be solar heat, geothermal heat, waste heat and/or the heat of direct combustion.

Heat energy transferred to the liquid coolant contained in the closeable loop referred to in the immediate foregoing is circulated and directed for the performance of useful work in the following manner:

The hot coolant, which may be considered as originating at the secondary side of heat exchanger 165 is drawn by a pump 169 through pipe 168, propelled through pipe 170, through the inner tubes of heat exchanger 122 wherein the coolant gives up a major portion of its heat energy to further evaporate or superheat the propellant of the primary circuit.

In the normal course of system operation the coolant leaving heat exchanger 122 and still at a useable temperature level is directed as follows:

Through pipe 173, modulating valve 174, pipe 175 which directs the coolant to means of heat exchange (not shown) in the utility heating area wherein the coolant gives up a further portion of its heat for the useful purpose of furnishing utility heating.

Leaving the utility heating area at yet further reduced temperature, the coolant is returned to heat exchanger 165 by way of pipe 176, modulating valve 177, and pipe 178. It will be noted that modulating valve 180, located in a pipe branch associated with pipe 173, is maintained in the fully closed position during the operation of the heat transfer subsystem last described.

Another method of directing and utilizing the heat contained in the coolant originating at the secondary side of heat exchanger 165 assumes that the internal combustion engine 94 and the compressor 96 are out of function, either due to failure, or to the existance of a situation such that the only demand made on the system is for the production of limited quantities of electrical power. In such situation, the system's expansion engine 89, being coupled to generator 92 by a now closed automatic clutch 91 (automatic clutch 93 being in the open or disconnect position), would still be capable of driving said generator 92 at reduced load as long as it continued to receive heat energy originating at heat exchanger 165. In operating the high temperature heat circuit in the circumstances as last discussed, the heated coolant having been passed through heat exchanger 122 and pipe 173 is diverted by the closing of modulating valve 174, through pipe 179, modulating valve 180, (now in the open position) pipe 181, non-return valve 189, pipe 190, pipe 149 (valve 148 being in the closed position), and through the inside of tubes contained in heat exchanger 118. During passage through heat exchanger 118 a major portion of the heat left in the coolant after passage through heat exchanger 122 is transferred to the colder primary circuit fluid in order to commence the evaporation of same.

Leaving heat exchanger 118 by way of pipe 150 the lowered temperature coolant is returned to heat exchanger 165 by way of non-return valve 151, pipes 152 and 182, modulating valve 183, pipe 184 and pipe 178. It will be noted that valves 174, 148, 188, 154 and 177, all located in piping associated with the flow circuit last described, are maintained in the fully closed position during the operation of said flow circuit.

Detailed means whereby heat from other heat level circuits supplying heat energy to the primary circuit may be controlled in order to divert all or part of said heat for the purpose of providing utility heat is as follows:

(A) HEAT PUMP CIRCUIT

The manner in which heat energy originating with the heat pump, and being delivered to the system's primary circuit may be diverted for utility heating has been dealt with in the foregoing in conjunction with the disertation on system start up condensing of the heat pump refrigerant.

(B) INTERNAL COMBUSTION ENGINE WATER JACKET HEAT CIRCUIT

Heat energy originating at the water jacket of the internal combustion engine 94, and being delivered via the medium of a liquid coolant contained in a closeable loop to the system's primary circuit, is diverted by the closing of modulating valve 148 to branch pipe 171, said branch pipe 171 originating at pipe 147 immediately upstream of modulating valve 148, said modulating valve 148 being located at the downstream end of pipe 147, said pipe having its upstream end connected to the downstream side of the closable loop's circulating pump 146. Leaving branch pipe 171, the hot coolant flows through modulating valve 185 which has been opened coincident with the closing of modulating valve 148, the coolant is then propelled through pipe 186 to means of heat exchange (not shown) located in the utility heating area wherein the coolant gives up useable heat. Leaving the heat exchanger located in the utility heat area, the now cooler fluid is returned to the water jacket of the internal combustion engine 94 by way of pipe 187, modulating valve 188, pipe 153, modulating valve 154 and pipe 155.

It should be noted that in diverting the entire coolant flow from the water jacket of the internal combustion engine 94 to the utility heat area, modulating valves 185, 188 and 154 are maintained in the fully open position and modulating valves 148 and 183 are maintained in the fully closed position. In the event however that a condition of heat demand requires that the heat emanating from the water jacket of the internal combustion engine 94 be apportioned to both the system's primary circuit and utility heat, intermediate settings of modulating valves 148 and 185 would readily satisfy such a condition.

(C) INTERNAL COMBUSTION ENGINE EXHAUST HEAT SYSTEM

Heat emanating from the exhaust of the internal combustion engine 94, being transferred in a manner already described to a heat exchanger 99 and delivered via the medium of a liquid coolant contained in a closeable loop to the system's primary circuit, is diverted by the closing of modulating valve 160 from entry to the primary circuit's second temperature level heat exchanger 120 and made to flow by the propelling action of the closeable loop's circulating pump 157 through modulating valve 191, which has been opened coincident with the closing of modulating valve 160. The hot coolant is then propelled through pipe 192 to means of heat exchange (not shown) located in the utility heating area, wherein the hot coolant gives up useable heat. Leaving the downstream side of the heat exchanger located in the utility heat area the now cooler fluid is returned to the exhaust system's heat exchanger 99 by way of pipe 193, modulating valve 194, pipes 195 and 164. It should be noted that in order to divert the entire heat flow from the secondary side of heat exchanger 99 to the utility heat area, modulating valves 191 and 194 would be maintained in the fully open position and modulating valves 160 and 163, offering access to the primary circuit's second temperature level heat exchanger 120, are maintained in the fully closed position. In the event however, that a condition of system heat demand requires heat flow from the internal combustion engine's exhaust heat exchanger 99 to be supplied to both the primary circuit and the utility heat area simultaneously, intermediate settings of modulating valves 160 and 191 would accomodate this situation.

In order to provide heat source water for the heat pump evaporator 132, water of suitable temperature is drawn through pipe 196, modulating valve 197 and pipe 198 by pump 199 which then propels said water across the outside of tubes contained in evaporator type heat exchanger 132 wherein the heat source water gives up a measure of its heat to the refrigerant being expanded through the inside of the tubes contained in said heat exchanger 132. Leaving heat exchanger 132, the heat source water now at reduced temperature is ejected by way of pipe 200, modulating valve 201 and pipe 202. The chilled liquid (water) leaving pipe 202 is now available for process chilling and/or air conditioning.

It should be noted that in operating the heat source water circuit in the manner aforedescribed, modulating valves 197 and 201 are maintained in the fully open position while modulating valves 212 and 215 located in branch pipes associated with the aforedescribed heat source water circuit are maintained in the fully closed position.

Cooling for the condenser 126 of the primary circuit is provided in the following manner: Cooling water is drawn through pipe 203, modulating valve 204 and pipe 205 by pump 206, which then propels said water through pipe 207, and the inside of tubes contained in condenser type heat exchanger 126, wherein heat is abstracted from the propellant fluid of the primary circuit flowing across the outside of the tubes contained in heat exchanger 126, and said propellant is returned to the liquid phase for recommencement of the cycle.

Leaving heat exchanger 126, the now warmer cooling water is expelled by way of pipe 208, modulating valve 209 and pipe 210. It will be noted that in the simple water flow circuit last described, modulating valve 204 and 209 are maintained in the fully open position and modulating valves 212 and 215, located in branch pipes associated with the last described flow circuit, are maintained in the fully closed position.

By further reference to FIG. 4 and the flow circuit last described, it will be noted that a by-pass comprising pipe 211, modulating valve 212 and pipe 213 interconnects pipe 208, said pipe 208 being a water discharge line from heat exchanger 126, and pipe 198, said pipe being a suction line to pump 199 which functions to supply heat source water to the heat pump's evaporator 132.

In purpose of function, the referred to by-pass is intended to supply higher temperature heat-bearing water from the discharge side of the primary circuit's condenser 126 to the heat pump evaporator 132 under such conditions of system operation that benefit would be obtained from said transference of heat. In conditions of system operation where utilization of the by-pass is tolerable, the environment would benefit from lowered levels of thermal pollution on the one hand and lessened abstraction of heat from heat source water on the other, since condenser losses would be in part recoverable. In functional operation of the by-pass water flowing through pipe 208 from the system's primary circuit condenser 126 is channelled, at least in part, through pipe 211, modulating valve 212, pipes 213 and 198 to the suction side of pump 199. Modulating valves 209, 212 and 197 would, in most instances operate at intermediate settings in order to obtain optimum conditions of energy balance.

By referring again to the cooling water supply circuit for the condenser 126, it will be noted that a second by-pass comprising pipe 214, modulating valve 215, and pipe 216 interconnects pipe 200, said latter pipe being a discharge water line from the heat pump evaporator 132, and pipe 205 the latter pipe being a suction line feeding pump 206 which delivers cooling water to condenser 126. In purpose of function, this by-pass is designed to supply chilled water leaving the heat pump's evaporator 132 to the condenser 126, in order to maintain or increase the efficiency of said condenser 126. Generally speaking, the by-pass as aforedescribed would be out of function when a heavy demand exists for chilled water (leaving the heat pump evaporator 132) for such purposes as air conditioning and/or process chilling. In functioning operation of the by-pass, water flowing through pipe 200, said pipe being a discharge water line from the heat pump evaporator 132, is made to flow through pipe 214 by the closing or partial closing of modulating valve 201, through modulating valve 215, said valve having been opened coincident with the closing of valve 201. Leaving modulating valve 215, the chilled water being by-passed from evaporator 132 is then channelled through pipes 216 and 205 to the suction side of pump 206 which acts to feed the chilled water so received to condenser 126.

In considering variants to the system of Methods "A", "B", and "C" as earlier referred to in this specification, and referring first to System Variant 1) wherein a warm air or other heat source gas is substituted for the previously dealt with water source used to furnish heat to the heat pump's evaporator, such substitution would necessitate the following changes to the system:

FOR METHODS "A" AND "B" (Ref. FIGS. 1 and 3)

The following items, becoming superfluous, would be removed from the system: Pipe 40, evaporator 41, pipe 43, valve 44, pipe 45, pump 46, pipe 47, pipe 48, valve 49, pipe 50, pipe 77, valve 78 and pipe 79.

In addition to removing the items afore listed, a number of items enumerated below and comprising components of the primary circuit's condenser water flow circuit, but which are closely associated with the operation of the water source type heat pump's evaporator, would also become superfluous and would therefore be removed from the system: pipe 72, valve 73, pipe 74, pipe 66 and valve 67. Moreover, in adapting the primary system's water cooled condenser for function without inlet and outlet by-passes, pump inlet pipe 68 would be foreshortened immediately downstream from branch pipe 79, and water discharge pipe 71 would be foreshortened immediately upstream from branch pipe 72. Such modification would illustratively reduce the roles of said pipes 68 and 79 to that of simple inlet and outlet means of water flow for the primary circuit's condenser 24.

In FIGS. 5 and 6 a typical "air through" finned coil type evaporator assembly 217 is shown, the coil 218, is located in a section of duct 219, said duct also acting to locate and retain an electrically operated fan unit 220 on the upstream side of the evaporator coil 218.

In the installation of an evaporator of the type shown in FIGS. 5 and 6 as a substitute for the water heat source evaporator 41 the pipe designated "inlet" in FIG. 5 would be connected to expansion valve 39, and the pipe designated "outlet" would be connected to or integrated with pipe 42, said pipe being the return line to the system's compressor 26.

In the substitution of an air heat source evaporator assembly 217, comprising coil 218, duct 219 and fan unit 220 in the system of Method "C" illustratively shown in FIG. 4, the procedure to be followed would be identical to that followed for Methods "A" and "B" except that items to be removed from the system would be of different enumeration and in accordance with the following listing:

Pipe 196, valve 197, pipe 198 pump 199, evaporator 132, pipe 200, valve 201, pipe 202, pipe 214, valve 215, pipe 216, pipe 203, valve 204, pipe 210, valve 209, pipe 211, valve 212 and pipe 213.

In addition to the removal of the afore listed items from the system, water inlet pipe 205 to the system's condenser 126 would be foreshortened on the downstream side of the point of entry of branch pipe 216, and pipe 208 being the water outlet from condenser 126 would be foreshortened immediately upstream of the connecting point of pipe branch 211.

In the installation of an "air through" evaporator assembly 217 in the system of Method "C", the pipe designated in FIG. 5 as "inlet" would be connected to the expansion valve 131 and the pipe designated "outlet" would be interconnected with pipe 133. The advantages of an air or warm gas heat-source type evaporator over the water heat-source type lies mainly in the simplicity of its construction and the fact that in warmer climates such as tropical and sub-tropical areas, a heat source of an almost corrosion-free nature is by the large nearly everywhere available.

In System Variant (2) the substitution of an air cooled type "start up" condenser for the water cooled type shown in FIGS. 1 and 3. (Method "C" of system operation having its own mode of "start up" condensing) the following procedure would be followed: Pipe 15, pump 52, pipe 53, pipe 54, pipe 31, condenser 32 and pipe 33 would be removed from the system and replaced with an "air through" type condenser assembly 221 as shown in FIG. 7 and consisting of coil 222 contained in duct 223 and supplied cooling air by a fan unit 224. In making the installation of the "air through" condenser, the coil inlet identified in FIG. 7 would be connected to valve 35 and the coil outlet also identified in FIG. 7 would be connected to valve 34. In the functioning of the condenser as shown in FIG. 7, cooling air is forced across coil 222 by fan unit 224 and ejected through the outlet side of duct 223, said air removing in its passage a sufficiency of heat from the refrigerant flowing through coil 222 to achieve condensing of the refrigerant contained in the heat pump circuit. As in the instance of the water cooled heat pump start up condenser 32, the air cooled condenser as last discussed would only remain in operation until such time as a steady flow of liquid propellant to the primary system's liquid distribution header 9 becomes available.

In the substitution of an air cooled condenser, reference System Variant (3) for the water cooled type used for condensing the primary circuit's propellant in Methods "A", "B", and "C" of system operation and as reflected in FIGS. 1, 3 and 4, the following procedure would be followed: In the case of Methods "A" and "B" of system operation, the following items would be removed from the system: pipe 66, valve 67, pipe 68, pump 69, pipe 70, condenser 24, pipe 71, pipe 72, valve 73, pipe 74, valve 75, pipe 76, valve 44, pipe 43, valve 49, pipe 50, pipe 77, valve 78, and pipe 79. In addition to removing the afore listed items, pipe 45, being the suction line of pump 46 supplying water to heat pump evaporator 41, would be foreshortened immediately downstream of the intersection of pipes 45 and 76. Moreover pipe 48 being the chilled water discharge line from heat pump evaporator 41 would be foreshortened on the upstream side of the point of intersection of said pipe 48 with pipe 77. In the installation of an air cooled condenser assembly 225 as shown in FIG. 8, the pipe designated "inlet" would be interconnected with the outlet pipe 23 from the system's expansion engine 20, and the pipe designated "outlet" in FIG. 8 would be interconnected with pipe 25, said pipe being the inlet pipe to the system's liquid reservoir 1.

In the operation of an air cooled condenser assembly 225 as last described, air propelled through coil 226 by fan unit 228 is expelled from the downstream end of duct 227, said air removing in its passage through coil 226 sufficient heat from the primary circuit's propellant to effect condensing of said propellant, which is then returned via the outlet of coil 226 and pipe 25 to the primary circuit's liquid reservoir 1.

In substituting an air cooled condenser of the type shown in FIG. 8 for the water cooled type 126 as shown in FIG. 4 (Method "C" of system operation), the procedure to be followed would be identical to that followed for Methods "A" and "B" as last described, except that the coil inlet as designated in FIG. 8 would be interconnected with pipe 125 and the coil outlet would be interconnected with pipe 127.

Items rendered superfluous by the last referred to substitution are of the following enumeration and description, said enumeration and description being in accord with details reflected in FIG. 4: pipe 203, valve 204, pipe 205, pump 206, pipe 207, condenser 126, pipe 208, valve 209, pipe 210, pipe 211, valve 212, pipe 213, valve 197, pipe 196, pipe 202, valve 201, pipe 214, valve 215, and pipe 216.

In addition to removing the last enumerated items from the system in order to effect a change from a water cooled to an air cooled system of condensing the primary fluid, pipe 195 being an inlet pipe to the heat pump's evaporator 132 would be foreshortened downstream of its intersection with pipe 213, and pipe 200 being an outlet pipe from said heat pump evaporator 132 would be foreshortened upstream of its intersection with pipe 214.

In considering the selective choice of air or water flow heat exchangers for primary circuit condensing, heat pump evaporating, start up condensing and the many possible combinations of same, it will be apparent that the choice for a specific system installation would be largely governed by climate, geographic location, environmental circumstances and types of heat energy immediately available.

By referring again to FIG. 4 and the tandem arrangement of the four major items of rotating equipment—expansion engine 89, generator 92, internal combustion engine 94 and compressor 96 all said items being instantaneously connectable to or disconnectable from its adjacent neighbor by electrically actuated automatic clutches 91, 93 and 95, some measure of the particular system flexibility will be apparent.

Having made the disclosure as set forth herein, including certain system component arrangements as shown in the drawings, which are merely indicative of certain approaches contemplated by my invention, and being aware of the many modifications possible in an operating unit and the many modifications likely to appear to those skilled in the art, it is accordingly stated that my invention is not limited to the embodiments illustrated and described herein, but further includes all modifications and variations as may fall within the scope of the following claims.

What is claimed is:

1. An improved vapor power system utilizing multiple heat supplies, comprising:
   a. a first closed loop comprising: an expansion engine; a refrigerant used as a propellant for said expansion engine; a pumping means for said propellant when said propellant is in liquid phase; a first heat exchange means whereat said propellant receives heat calculated to raise its energy level while said propellant is retained in liquid phase; a second heat exchange means of series connected construction whereat heats at multiple temperature levels are transferred to said propellant thereby evaporating said propellant and raising its kinetic energy to such level, whereby it performs work on the said expansion engine so that said expansion engine is made to produce useful shaft work; and condenser means for abstracting from the said propellant a portion of the heats left unutilized by the said expansion engine to return said propellant to liquid phase;

b. a second closed loop comprising: a refrigeration compressor; a heat engine for driving said compressor; a refrigerant being pumped by said compressor; an expansion valve through which the said refrigerant is expanded when pumped by the said compressor; an evaporator means wherein heat is absorbed by the said refrigerant while being expanded from the liquid to vapor phase, said refrigerant then being channelled to said compressor means whereat it experiences a temperature rise while being pumped to heat exchange with the said propellant of the said first closed loop and whereby a first heat supply is provided for the propellant of the said first closed loop and a condensing means is provided for the said refrigerant of the said second closed loop;

c. a third closed loop comprising: a pumping means; the coolant jacketing means of the said heat engine driving the compressor means of the said second closed loop; the said series connected heat exchange means of said first closed loop; and a heat transfer fluid; said pumping means placing said heat transfer fluid in circulation so as to transfer, by heat exchange, heat losses normal to the coolant system of a heat engine to the said propellant of the said first closed loop and whereby a second heat supply is provided for the said propellant of the said first closed loop and a cooling means is provided for the said heat engine driving the said compressor of the said second closed loop;

d. a fourth closed loop comprising: a pumping means; an exhaust cooling heat exchange means integrated in the exhaust system of the said heat engine driving said compressor of said second closed loop; said series connected heat exchange means of the said first closed loop; and a heat transfer fluid; said pumping means placing said heat transfer fluid in circulation so as to transfer at least a portion of the heat losses normal to the exhaust system of a heat engine to said propellant of said first closed loop and whereby a third source of heat to the said propellant is provided;

e. a fifth closed loop comprising: a pumping means; a heat exchange means wherein heats at temperatures higher than the heats conveyed in the said second, third, and fourth closed loops are obtained; said series connected heat exchange means of said first closed loop; and a heat transfer fluid; said pumping means placing said heat transfer fluid in circulation so that a fourth and highest temperature heat is transferred by heat exchange to said propellant of the said first closed loop;

f. a condenser coolant supply circuit comprising: a pumping means; a heat transfer fluid, said heat transfer fluid serving as a coolant; and the condenser means of said first closed loop; said pumping means placing said heat transfer fluid, while at appropriate temperature, in flow circumstance so that heat is abstracted from the said condenser means of the said first closed loop and whereby condensing of the said propellant of the said first closed loop is effected;

g. an evaporator heat supply circuit comprising: a pumping means; a heat transfer fluid, said heat transfer fluid serving as a heat supply means; and said evaporator means of the said second closed loop; said pumping means placing said heat transfer fluid, while at appropriate temperature, in flow circumstance so that heat supply to the said evaporator of the said second closed loop is effected;

h. a first heat transfer bypass comprising: valve and piping means interconnecting said condenser coolant supply circuit with the said evaporator heat supply circuit; and valve means associated with said condenser coolant supply circuit and the said evaporator heat supply circuit; said valve means permitting the coolant heat transfer fluid of the said evaporator means to be propelled to the inlet side of the said condenser coolant supply circuit and thereby provide at least a portion of the required cooling means for the condenser means of the said first closed loop; and i. a second heat transfer bypass comprising: valve and piping means interconnecting the said condenser coolant supply circuit with the said evaporator heat supply circuit; and valve means associated with said condenser coolant supply circuit and the said evaporator heat supply circuit; said valve means permitting the warm heat transfer fluid leaving said condenser means to be propelled to the inlet side of the said evaporator heat supply circuit and thereby provide at least a portion of required heat for the evaporator means of the said second closed loop.

2. An improved vapor power system as defined in claim 1, wherein said first heat exchange means of said second closed loop is removed from function, and including means for channelling the hot refrigerant leaving the compressor means of the second closed loop directly to the said series connected heat exchange means of said first closed loop, whereat it gives up heat to the propellant of the said first closed loop and whereby an alternative first heat supply for the said propellant is provided, and a condensing means is provided for the said refrigerant of the said second closed loop.

3. The system of claim 1 wherein a source of heat to the said evaporator means of the said second closed loop comprises the heat contained in the ambience of an enclosed area.

4. The system of claim 1 wherein a source of heat to said evaporator means of the said second closed loop comprises the heat contained in the ambience of an unenclosed area.

5. The system of claim 1 wherein a source of heat to said evaporator means of the said second closed loop is heat abstracted from the condenser means of the said first closed loop, and whereby heat losses normal to an expansion engine when raised in temperature by a compressor means become an energy input to said expansion engine.

6. The system of claim 1 wherein a source of heat to said heat exchange means of the said fifth closed loop is the heat of solar concentration.

7. The system of claim 1 wherein a source of heat to said heat exchange means of said fifth closed loop is geothermal heat.

8. The system of claim 1 wherein a source of heat to said heat exchange means of said fifth closed loop is waste heat.

9. The system of claim 1 wherein a source of heat to said heat exchange means of said fifth closed loop is the heat of direct combustion.

10. The system of claim 1 wherein a source of cooling for said condenser means of said first closed loop is a chilled heat transfer fluid exiting said evaporator of said second closed loop, said heat transfer fluid having been chilled in the process of transferring heat to the refrigerant of said second closed loop, and whereby a process for obtaining heat to power a vapor cycle power system becomes a means for obtaining cooling for said condenser means of said vapor power system.

11. The system of claim 1 including heat transfer bypass flow circuits, comprising piping and valve means integrated with said second, third, fourth, and fifth closed loops, for diverting, for utilitarian heating purposes, the heat energies of said closed loops which are normally directed to said propellant of said first closed loop.

12. The system of claim 1 including first clutch means for connecting said expansion engine, at one end of its drive shaft, to an eletric generator; second clutch means for connecting said electric generator to said heat engine; and third clutch means for connecting said heat engine to said compressor means, whereby by selective manipulation of said clutch means, the following circumstances of system component function can be effected:

a. with said first and second clutch means open, and said third clutch means closed, said vapor cycle power system functions to perform rotational work;

b. with said first and third clutch means closed, and said second clutch means open, said vapor power system functions to produce electrical energy;

c. with said first and third clutch means open (expansion engine and compressor means out of function), and said second clutch means closed, said heat engine functions as a standby means of producing electrical energy in quantities representing at least a portion of the rated load of the electric generator while simultaneously producing useable heats in the order of a co-generation system; and d. with said first and second clutch means open (expansion engine and electric generator out of function), and said third clutch means closed, said heat engine functions to drive a refrigeration system of the heat pump type with the capability of providing both heating and cooling.

* * * * *